(12) United States Patent
Piccolo, III

(10) Patent No.: US 10,074,254 B2
(45) Date of Patent: Sep. 11, 2018

(54) CLOUD-BASED METHOD AND APPARATUS FOR CONFIGURING A FIRE PANEL

(71) Applicant: Tyco Fire & Security GmbH, Neuhausen am Rheinfall (CH)

(72) Inventor: Joseph Piccolo, III, Fitzwilliam, NH (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 416 days.

(21) Appl. No.: 14/084,721

(22) Filed: Nov. 20, 2013

(65) Prior Publication Data
US 2015/0142898 A1    May 21, 2015

(51) Int. Cl.
| G08B 17/00 | (2006.01) |
|---|---|
| H05B 37/02 | (2006.01) |
| H04L 12/28 | (2006.01) |
| G08B 25/00 | (2006.01) |
| G08B 25/14 | (2006.01) |

(52) U.S. Cl.
CPC ........... *G08B 17/00* (2013.01); *G08B 25/003* (2013.01); *G08B 25/14* (2013.01); *H04L 12/282* (2013.01); *H05B 37/02* (2013.01)

(58) Field of Classification Search
None
See application file for complete search history.

(56) References Cited

U.S. PATENT DOCUMENTS

| 7,206,834 | B1 * | 4/2007 | Barth | G05B 19/406 340/3.1 |
|---|---|---|---|---|
| 8,154,398 | B2 * | 4/2012 | Rolf | G01W 1/00 340/10.1 |
| 8,214,494 | B1 * | 7/2012 | Slavin | G08B 25/08 709/203 |
| 8,310,335 | B2 * | 11/2012 | Sivakkolundhu | H04L 12/281 340/3.1 |
| 8,910,259 | B2 * | 12/2014 | Papakostas | H04L 63/0281 726/7 |
| 8,990,887 | B2 * | 3/2015 | Kocsis | H04L 9/321 726/2 |
| 9,013,294 | B1 * | 4/2015 | Trundle | G08B 25/001 340/501 |
| 9,026,648 | B1 * | 5/2015 | Slavin | G08B 25/08 709/224 |
| 9,119,236 | B1 * | 8/2015 | Martin | G05B 15/02 |
| 2008/0048861 | A1 * | 2/2008 | Naidoo | G08B 13/19669 340/541 |
| 2008/0072314 | A1 * | 3/2008 | Frenette | G08B 25/14 726/19 |
| 2009/0286484 | A1 * | 11/2009 | Phung | H04L 12/24 455/67.11 |
| 2010/0023865 | A1 * | 1/2010 | Fulker | G06F 3/04817 715/734 |

(Continued)

*Primary Examiner* — Shirley Zhang

(57) ABSTRACT

An alarm panel configuration system for facilitating cloud-based configuration of the alarm panel is provided. The configuration system may include a remote server providing a remotely accessible configuration file modification interface, the configuration file modification interface configured to compile a configuration file and transmit the configuration file to a mobile device, and an alarm panel configured to receive the configuration file from the mobile device.

23 Claims, 5 Drawing Sheets

(56) References Cited

U.S. PATENT DOCUMENTS

| | | | | |
|---|---|---|---|---|
| 2010/0274366 A1* | 10/2010 | Fata | ............... | G05B 15/02 |
| | | | | 700/7 |
| 2013/0035774 A1* | 2/2013 | Warren | ............... | A01G 25/167 |
| | | | | 700/90 |
| 2014/0359101 A1* | 12/2014 | Dawes | ............... | H04L 41/18 |
| | | | | 709/223 |
| 2015/0220318 A1* | 8/2015 | Mangaiahgari | ....... | H04W 4/001 |
| | | | | 717/169 |

\* cited by examiner

CLOUD-BASED METHOD AND APPARATUS FOR CONFIGURING A FIRE PANEL

FIELD OF THE DISCLOSURE

The disclosure relates generally to the field of alarm systems, and more particularly to a system and method for configuring an alarm system panel using the benefit of cloud computing.

BACKGROUND OF THE DISCLOSURE

Alarm systems, such as fire alarm and security systems, typically include one or more alarm panels that receive information from various sensors distributed throughout a structure or area. For example, a typical fire alarm system may include a plurality of initiating devices (e.g. smoke detectors, manually-actuated pull stations, etc.) and notification appliances (e.g., strobes, sirens, public announcement systems, etc.) operably connected to one or more alarm panels.

During normal operation of the alarm system, the alarm panel may monitor electrical signals associated with each of the initiating devices for variations that may represent the occurrence of an alarm condition. For example, a variation in a particular electrical signal may represent the detection of smoke by a smoke detector in a corresponding area, or "zone," of a structure in which the smoke detector is located, and may cause the alarm panel to enter an alarm mode. The alarm panel may be configured to respond to such a condition by initiating certain predefined actions, such as activating one or more of the notification appliances within the monitored structure and/or notifying an external monitoring company.

When an alarm system is installed, activated, modified, etc., the system may require "configuration". In general, configuring an alarm panel may involve a number of complex steps that include configuring the panel to recognize, monitor, and activate the various devices and appliances connected to the alarm panel. Furthermore, configuring the alarm panel includes defining what constitutes an alarm condition as well as what actions to take when an alarm condition is detected. For example, configuring the alarm panel may include associating the initiating devices with the alarm panel; configuring desired parameters for monitoring the initiating devices; associating the notification appliances with the alarm panel; placing the initiating devices and notification appliances into groups (e.g., based on location, function, etc.); programming actions to take when variations in the electrical signals of the initiating devices are detected; programming conditions that cause an alarm; and programming actions to take when an alarm is detected.

In addition to initially configuring the alarm panel (e.g., during an initial installation of the alarm system, or the like), the alarm panel may need to be reconfigured and or adjusted each time changes are made to the location of the devices and/or appliances connected to the alarm panel. For example, if a portion of the building in which the alarm system is located is remodeled, then changes to the locations, number, grouping, and/or arrangement of the initiating devices and notification appliances may need to be made. As another example, if the name of a room having an initiating device and/or notification appliance located therein is changed, the label for the initiating devices may need to be changed. As will be appreciated, making these changes, particularly in the case of fire alarm systems, requires an on-site technician to ensure that the changes are made properly and that they meet certain regulations that may exist for the location of the alarm system.

In order to configure an alarm system panel, particularly for complex and/or high-end alarm systems, a significant amount of configuration information must be defined. This typically requires the use of a computing device such as, for example, a laptop. The configuration information can then be compiled into a configuration file that is transferred to the alarm panel. The problem is that on-site technicians are required to have a computer (e.g., laptop, or the like) loaded with the appropriate configuration software as well as the requisite training to use the computer and associated configuration software. This adds an expense to the company responsible for configuring and/or updating the configuration of the alarm panel. Furthermore, the technician is required to be on-site for an extended period of time in order to enter the configuration information, compile the configuration file and transfer the configuration file to the alarm panel.

One solution to the above problems includes allowing configuration changes via a user interface accessible on the alarm panel. This is effective, however, for small installations and/or simple alarm systems particularly due to the fact that alarm system panels are often not equipped with keyboards, large displays, or complex user interfaces. For example, a typical alarm system panel may have a small display (e.g., 3-10 inches) and a numeric keypad. Imagine entering all the configuration information necessary to configure an alarm system installed in a 50-story office building using such a numeric keypad and small display. As another example, imagine needing to re-enter all the configuration information when components (e.g., memory, CPU card, or the like) of the alarm panel are replaced. As can be appreciated, the relatively primitive user interface (as compared to a computer) makes this solution impractical.

Another solution to the above problems includes building the configuration file remotely, such as, at a central service center. However, inventorying all the configuration information and/or sending the configuration information back and forth to the central service center and receiving the configuration file may be impractical without the use of a computer. In practice, it may be difficult to ensure that the centralized service center has the correct configuration information. Accordingly, it is often necessary to use the configuration file already loaded in the panel to make changes as opposed to making changes to one located on the central server, which may not be correct. However, making the necessary changes to a configuration file already loaded into the panel can be cumbersome, inefficient, and/or not possible using the panel interface alone. Furthermore, it may be difficult to effectively and/or accurately communicate the changes required in a cost effective manner. For example, it may be necessary to have multiple operators at the central service center to receive change instructions from the on-site technician.

It is with respect to these and other considerations that the present improvements are needed.

SUMMARY

In view of the forgoing, a system and method are disclosed for allowing configuration and/or updating the configuration of an alarm panel using the cloud. The system and method may allow a user to update the configuration of an alarm panel using a mobile device to access a configuration modification user interface provided by a remote server and then communicating configuration changes generated by the remote server to the alarm panel.

An exemplary embodiment of a method for configuring an alarm panel in accordance with the present disclosure can include receiving, at a mobile device, a configuration file from a remote server, establishing a connection between the alarm panel and the mobile device, and transferring the configuration file from the mobile device to the alarm panel.

Another exemplary embodiment of a method for configuring an alarm panel in accordance with the present disclosure can include receiving, at a remote server a job database from a mobile device connected to an alarm panel, receiving instructions from the mobile device, the instructions including indications of modifications to make to the job database, making at least one change to the job database based on the received instructions, compiling a configuration file from the changed job database, and transmitting the configuration file to the mobile device.

An exemplary system for configuring an alarm panel in accordance with the present disclosure can include a remote server providing a remotely accessible configuration file modification interface, the configuration file modification interface configured to compile a configuration file and transmit the configuration file to a mobile device and an alarm panel configured to receive the configuration file from the mobile device.

An exemplary alarm panel configurable via the cloud in accordance with the present disclosure can include a memory for storing a configuration file, a connection component for establishing a connection to a mobile device, and a configuration file receipt component for receiving a configuration file from the mobile device, where the configuration file is compiled on a remote server.

BRIEF DESCRIPTION OF THE DRAWINGS

By way of example, specific embodiments of the disclosed device will now be described, with reference to the accompanying drawings, in which.

DETAILED DESCRIPTION

Figure 1:
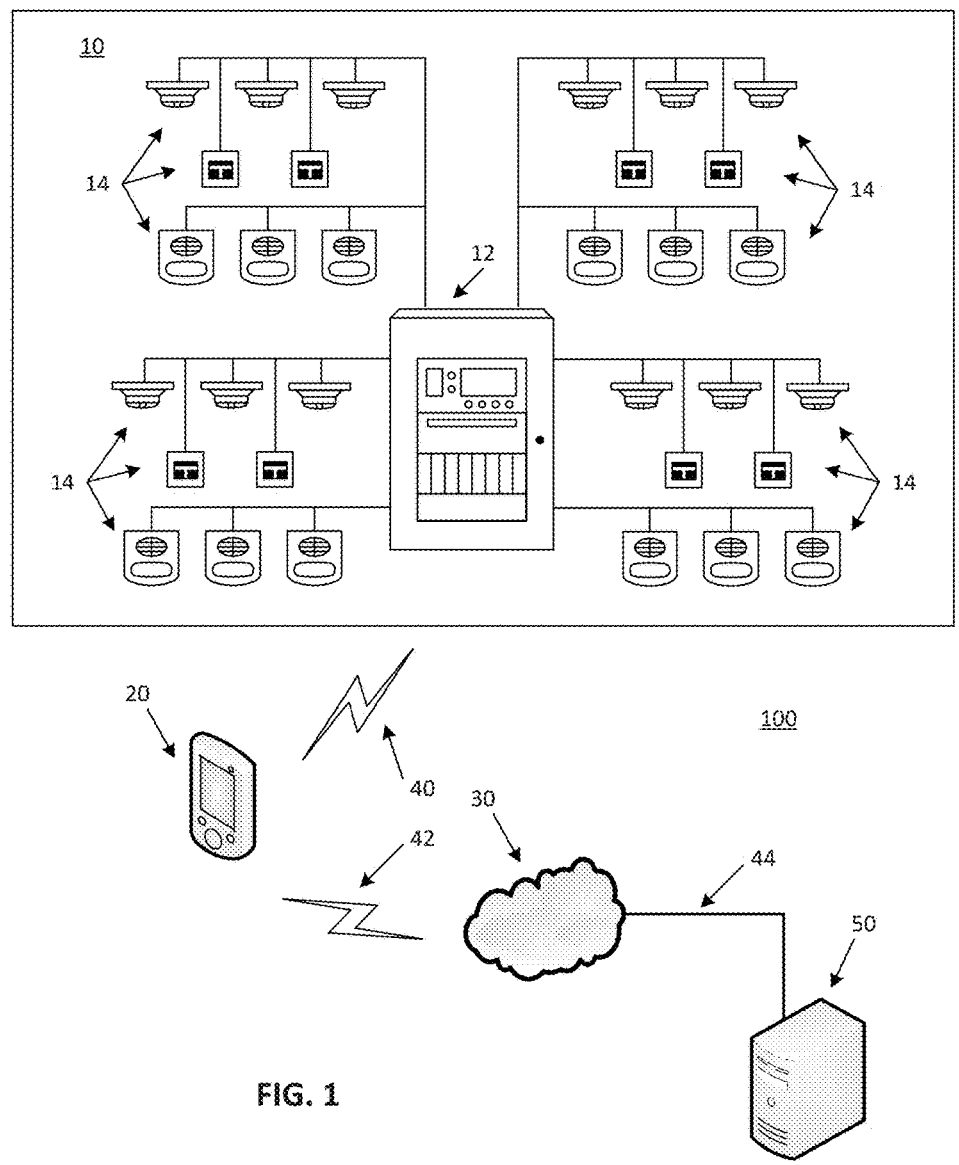
FIG. 1 is a block diagram illustrating an alarm panel configuration system in accordance with the present disclosure.

A system and method providing for the configuration of an alarm panel using the cloud in accordance with the present disclosure will now be described more fully hereinafter with reference to the accompanying drawings, in which preferred embodiments of the invention are shown. This disclosed system and method, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

It will be appreciated by those of ordinary skill in the art that the alarm panel configuration system and method described herein may be implemented in virtually any type of alarm or monitoring system, including, but not limited to, fire alarm systems, burglar alarm systems, surveillance systems, air quality monitoring systems, inventory monitoring systems, etc., or any combination thereof, such as may be provided for detecting an alarm event (e.g. a security breach) or a warning condition (e.g. an elevated temperature) in a building, structure, enclosure, or area (collectively referred to herein as "sites"). Many other applications are contemplated and may be implemented without departing from the scope of the present disclosure. All such applications are collectively referred to herein as "alarm systems."

A first exemplary configuration in accordance with the present disclosure is depicted in FIG. 1. The disclosed configuration system 100 may include an alarm system 10 installed at a monitored site. The alarm system 10 may include an alarm panel 12 operably connected to a number of points 14 (e.g., initiating devices and/or notification appliances). In order to configure (e.g., initially and/or update the configuration of) the alarm system 10, a configuration file must be loaded into a memory location in the alarm panel 12 (see FIG. 2). In general, the configuration file indicates the points 14 that are connected to the alarm panel, their type, their status (e.g., active, inactive, or the like), their function, alarm conditions, actions to take if alarm conditions are detected, etc. The configuration file is encoded into a format readable by the alarm panel 12, and is therefore not necessarily human-readable. The format may differ depending upon the type of alarm panel, the manufacturer of the alarm panel, the model of the alarm panel, etc. In addition, the configuration file may also provide a virtual map of the space where the alarm system is installed. Said differently, the configuration file may include a digitally encoded map of the monitored site, which may then be graphically displayed on a display of the alarm panel and/or notification devices, thus facilitating responding to an alarm condition.

A mobile device 20 may facilitate configuration of the alarm system 10. The mobile device 20 is communicatively coupled to the alarm panel 12 and a network 30 via connections 40 and 42 respectively. The system 100 further includes a remote server 50, which is communicatively coupled to the network 30 via connection 44. Thus, the mobile device 20 may communicate with the remote server 50 through the network 30. In general, the network 30 may be any network (e.g., a TCP/IP network, the Internet, a wide area network, or the like) that provides for data to be transmitted between the mobile device 20 and the remote server 50. The remote server 50 is referred to herein as being available over the cloud. As used herein, the term "cloud" is used to mean a network (e.g., the network 30). Accordingly, the phrase "cloud-based" means available over, accessible over, or utilizing, a network (e.g., the network 30).

The alarm panel 12 includes the ability to establish a connection (e.g., the connection 40) with the mobile device 20 and transmit (e.g., send and/or receive) a configuration file to/from the mobile device 20. The remote server 50 is configured to establish a connection (e.g., through the network 30) to the mobile device 20 and provide an interface (refer to FIGS. 7A and 7B) for generating the configuration file and sending the configuration file to the mobile device 20.

Example embodiments of the alarm panel 12, the mobile device 20, and the remote server 50 will now be described more fully with reference to FIGS. 2-4. Their operation, and example methods for cloud-based alarm panel configuration will be described with reference to FIGS. 5-6.

Figure 2:
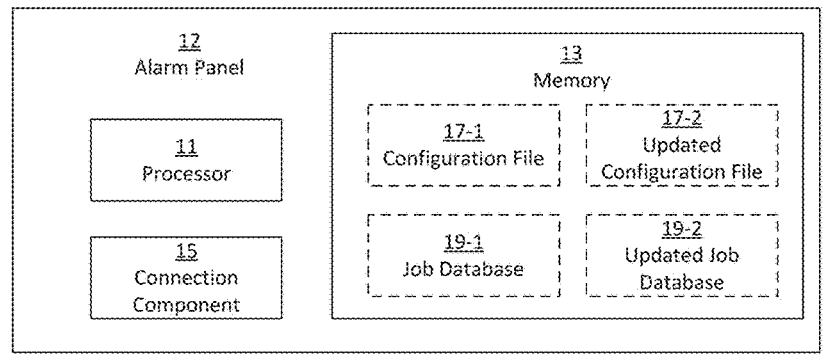
FIGS. 2-4 are block diagrams illustrating portions of the system shown in FIG. 1 is greater detail, all arranged in accordance with the present disclosure.

Turning now to FIG. 2, the alarm panel 12 may include a processor 11. The processor 11 can be any microprocessor configured to execute a set of instructions, which when executed, cause the alarm panel 12 to perform a set of actions defined by the instructions. The alarm panel 12 further includes a memory 13, which may be any type of computer-readable medium, including non-transient computer-readable medium, such as, for example, EPROM, EEPROM, ROM, FLASH, magnetic storage media, or the like. The alarm panel additionally includes a communication module 15 configured to establish communication with the mobile device 20. In general the communication module 15 may be configured to establish a wireless or a wired communication link with the mobile device 12 for purposes of transmitting data (e.g., configuration files, or the like) between the mobile device 20 and the alarm panel 12.

In some examples, the communication module 15 may be a wireless network interface component (e.g., a WIFI component, a Bluetooth component, or the like) that may accept a wireless connection from the mobile device. With some examples, the communication module 15 may be an Ethernet port, which may accept a connection to an Ethernet cable connected to the mobile device, wherein the mobile device 20 and the alarm panel may be communicatively connected. As another example, the communication module 15 may be an Ethernet port, which may access a connection to an Ethernet cable connected to a wireless router (e.g., a battery powered wireless router, or the like). The mobile device may then connect wirelessly to the wireless router, which facilities the communicative connection to the alarm panel 12. As a still alternative example, the communication component may be a USB port, which may accept a connection to a USB powered wireless network interface card (e.g., WIFI, Bluetooth, or the like). The mobile device may then connect wirelessly to the alarm panel 12 via the wireless network interface card.

The memory 13 of the alarm panel 12 stores configuration files 17, which may be used by the alarm panel 12 during operation. As depicted, a configuration file 17-1 and an updated configuration file 17-2 are shown. It is to be appreciated, however, that the alarm panel 12 may be configured to store any number of configuration files. Furthermore, in some examples, the alarm panel 12 may be configured to store a single configuration file. As such, when the updated configuration file 17-2 is loaded to the memory 13, it may replace (e.g., overwrite, or the like) the configuration file 17-1. As indicated, the configuration files 17 are often formatted such that the alarm panel 12 can read (e.g., process by the processor and/or other logic) the settings defined in the configuration file. The exact nature of the configuration files 17 is beyond the scope of the present disclosure. Those of ordinary skill in the art, however, will understand how to encode a configuration file such that the alarm panel 12 operates as desired based on the configuration file.

The memory may additionally store configuration settings files (referred to as a "job database") 19. The job databases 19 may define the settings encoded in the configuration files in an un-encoded format. Said differently, the job databases 19 may define the settings encoded in the configuration file in an easy to process and/or transfer format (e.g., XML, text, or the like). As depicted, a job database 19-1 and an updated job database 19-2 are shown. It is to be appreciated, however, that the alarm panel 12 may be configured to store any number of job databases. Furthermore, in some examples, the alarm panel 12 may be configured to store a single job database. As such, when the updated job database 19-2 is loaded to the memory 13, it may replace (e.g., overwrite, or the like) the job database 19-1.

Figure 3:
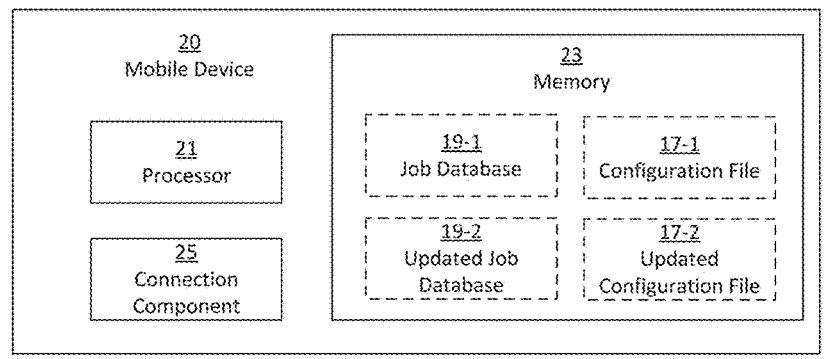

Turning now to FIG. 3, the mobile device 20 includes a processor 21, a memory 23, a communication module 25, and a number of input and output components 27. The processor 21 can be any microprocessor configured to execute a set of instructions, which when executed, cause the mobile device 20 to perform a set of actions defined by the instructions. Furthermore, the memory 23 may be any type of computer-readable medium, including non-transient computer-readable medium, such as, for example, EPROM, EEPROM, ROM, FLASH, magnetic storage media, or the like. In some examples, the mobile device 20 may be a smart phone, a tablet computer, etc.

A user (e.g., an on-site technician or the like) may use the mobile device 20 to configure the alarm system 10. For example, a connection between the mobile device 20 and the alarm panel 12 may be established. The connection module 25 may facilitate connection to the alarm panel 12. In some examples, the connection module 25 may be a wireless connection component, such as, WIFI, Bluetooth, or the like, which can be used to establish a communicative connection to the alarm panel 12. In some examples, the connection module 25 may be an accessory port (e.g., USB, or the like) which may accept a network connection card (e.g., WIFI card, Ethernet card, or the like) that may be used to connect the mobile device to the alarm panel 12. As such, as will be described in greater detail below, the configuration file 17-1 (or the updated configuration file 17-2) may be transmitted to the memory 13 of the alarm panel 12 using the connection (e.g., the connection 40) established between the connection components 25 and 15 of the mobile device 20 and the alarm panel 12.

The mobile device 20 may further be used to connect to the remote server 50 (see FIG. 4) in order to generate the configuration file 17-1 (or generate the updated configuration file 17-2). Said differently, the mobile device 20 may be used indicate (e.g., using an interface provided by the remote server 50) configuration settings and/or changes to configuration settings, cause the remote server 50 to generate a configuration file, receive the configuration file from the remote server 50 and upload the configuration file to the alarm panel 12. Additionally, the mobile device 20 may be used to access a configuration modification user interface (see FIG. 4) in order to create the job database 19-1 and then generate the configuration file 17-1 from the job database 19-1. In some examples, the mobile device 20 may be used to access the configuration modification user interface in order to create the updated job database 19-2 by specifying changes to make to the job database 19-1, after which, the updated configuration file 17-2 may be generated from the updated job database 19-2. As such, the mobile device 20 may also be configured to receive the job database 19-1 (e.g., from the memory of the alarm panel 12 or from another location) and transmit the job database 19-1 to the remote server 50.

The mobile device 20 includes a number of input and output components 27 configured to facilitate interaction with the mobile device 20 by a user (e.g., an on-site technician, or the like) in order to configure the alarm panel 12. For example, the input and output components may include a touch screen, a hardware button, a virtual button, a virtual keyboard, a display, a stylus, a speaker, a microphone, a slide out keyboard, etc.

Figure 4:
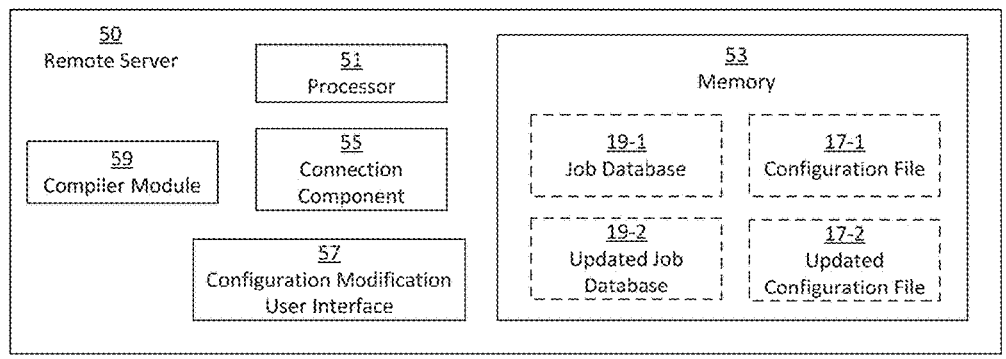

Turning now to FIG. 4, the remote server 50 includes a processor 51, a memory 53, a connection module 55, a configuration modification user interface module 57, and a compiler module 59. The processor 51 can be any microprocessor configured to execute a set of instructions, which when executed, causes the remote server 50 to perform a set of actions defined by the instructions. Furthermore, the memory 53 may be any type of computer-readable medium, including non-transient computer-readable medium, such as, for example, EPROM, EEPROM, ROM, FLASH, magnetic storage media, or the like. In some examples, the remote server 50 may be a computer (e.g., server, workstation, laptop, or the like).

In general, the remote server 50 provides an interface for the on-site technician to specify (e.g., using the mobile device 20) settings for the job database 19-1 or changes to make to the job database 19-1 to generate the updated job database 19-2; creates, based on input from the user via the configuration modification user interface 57, the job database 19-1 (or creates the updated job database 19-2); and generates the configuration file 17-1 (or generates the updated configuration file 17-2). The connection module 55 enables the remote server 50 to connect to the network 30 (e.g., via connection 44) for purposes of communicating with the mobile device 20. More specifically, the remote server 50 may communicate (e.g., receive the job database 19-1, receive changes to make to the job database 19-1, transmit the configuration file 17-1, transmit the updated configuration file 17-2, or the like) with the mobile device 20 over the network 30. In some examples, the connection module 55 may be an Ethernet port, where the network 30 is a network (e.g., the Internet, or the like) accessible via an Ethernet connection.

In typical embodiments, the job database 19 generally comes from the alarm panel 12, which may be transferred to the remote server 50 via the mobile device 20. In some examples, the job database 19 may be transferred directly to the central server 50 from the alarm panel 12 (e.g., in cases where the alarm panel 12 includes a remote service connection, or the like). Additionally, in some embodiments, the job database 19 may be transferred to the remote server 50 from a central backup server (not show) in cases where the job database is not available on the alarm panel 12.

The job databases 19 and the configuration files 17 may be transferred between the remote server 50 and the mobile device 20 using a variety of different transmission schemes, such as, attaching the files to an email message, transmitting the files using the file transfer protocol, uploading the files to a shared location (e.g., a cloud-based storage location, a shared folder accessible on the remote sever, or the like).

The configuration modification user interface 57 and the compiler module 59 facilitate creating and/or updating the job databases 19 and generating the configuration files 17. In some examples, the configuration modification user interface 57 may be displayed and operated on the mobile device 20, over the network 30, while the actual configuration modification user interface 57 executes on the remote server 50. In some examples, this may be facilitated using remote desktop hardware and/or software. In such examples, the configuration modification user interface 57 may be the configuration software for the alarm panel 12, executing on the remote server 50.

With some examples, the configuration modification user interface 57 may be a web-based interface (e.g., form using select boxes, drop down menus, or the like) for indicating changes to make to the job database 19-1. In some examples, the configuration modification user interface 57 may be implemented using voice and/or text commands (e.g., web pages, smartphone/tablet applications, text messages, instant message chats, voice calls, or the like) where changes to the job database 19-1 may be specified. For example, the configuration modification user interface 57 may be an automated telephone system where the on-site technician can call into (e.g., using a telephone feature, or a voice-over internet protocol feature of the mobile device 20) to indicate one or more changes to be made to the job database 19-1 using voice prompts, etc. As another example, the on-site technician may use the mobile device 20 to communicate with an off-site technician (e.g., using text messages, instant message chats, voice calls, or the like), the off-site technician may then make the indicated changes to the job database 19-1 (generating the updated job database 19-2 in the process) on the remote server 50 directly (e.g., by either being physically located at the remote server 50, or having access to the remote server 50, such as, over the network 30, or another network).

Given either of the job databases 19, the compiler module 59 may be activated to generate (e.g., compile, build, encode, or the like) the configuration files 17 from the selected job databases 19. For example, the compiler module 59 may generate the configuration file 17-1 from the job database 17-1. As another example, the compiler module 59 may generate the configuration file 17-2 from the updated job database 19-2. In some examples, the job database 19-1 can be transmitted to the remote server 50 and the configuration modification user interface 57 may facilitate making changes made to the job database 19-1 (thereby generating the updated job database 19-2), the compiler module 59 may be activated to generate the updated configuration file 17-2 from the updated job database 19-2. The updated configuration file 17-2 may then be transmitted to the mobile device 20, and uploaded to the alarm panel 12.

It is to be appreciated, that although the job databases 19 are described above as being stored in the memory 13 of the alarm panel 12, in some embodiments, the job databases 19 may be stored remotely to the alarm panel 12. For example, the job databases 19 may be stored in a memory storage location (e.g., the memory 53) of the remote server 50 or another memory storage location, such as, another memory storage location (not shown) accessible over the network 30. Furthermore, it is to be appreciated, that although the configuration files 17 and the job databases 19 are described above as being different files, they may instead be embodied in the same file.

It is to be appreciated, that in some examples, the mobile device 20 may rely on standard and/or conventional hardware and/or software components (e.g., telnet, FTP, web browser, etc.) for the above-described operation (e.g., communicating with the alarm panel 12 and the remote server 50, etc.). In some examples, these conventional components may be combined into an application of convenience that facilitates managing the above-described functions.

Figure 5:
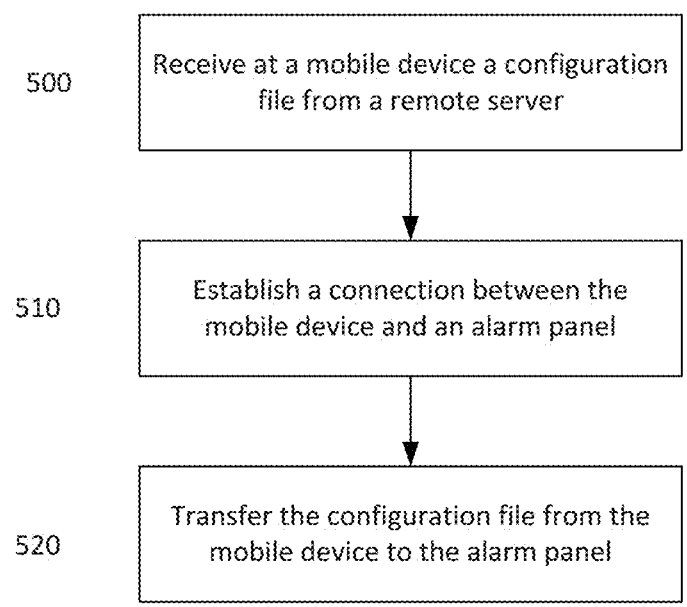
FIGS. 5-6 are flow diagrams illustrating exemplary methods for configuring an alarm panel in accordance with the present disclosure.

Referring now to FIG. 5, a flow diagram illustrating an exemplary method for configuring an alarm panel in accordance with the present disclosure is shown. At a first block 500 in the flow diagram, a mobile device may receive a configuration file from a remote server. For example, at block 500, the mobile device 20 may receive the configuration file 17-1 (or the updated configuration file 17-2) from the remote server 50.

Continuing from block 500 to block 510, a connection between an alarm panel and a mobile device is established. For example, at block 500, the mobile device 20 may establish a connection with the alarm panel 12. Continuing from block 510 to block 520, the configuration file is transferred from the mobile device to the alarm panel. For example, at block 520, the mobile device 20 may transfer the configuration file 17-1 (or the updated configuration file 17-2) received from the remote server to the memory 13 of the alarm panel 12.

In some examples, the mobile device 20 may also receive the job database 19-1 and transmit the job database 19-1 to the remote server 50, wherein the updated configuration file 17-2 can be compiled from a modified version of the job database 19-1. In some examples, the mobile device 20 may provide instructions to the remote server 50, the instructions including indications of modifications to make to the job database 19-1.

Figure 6:
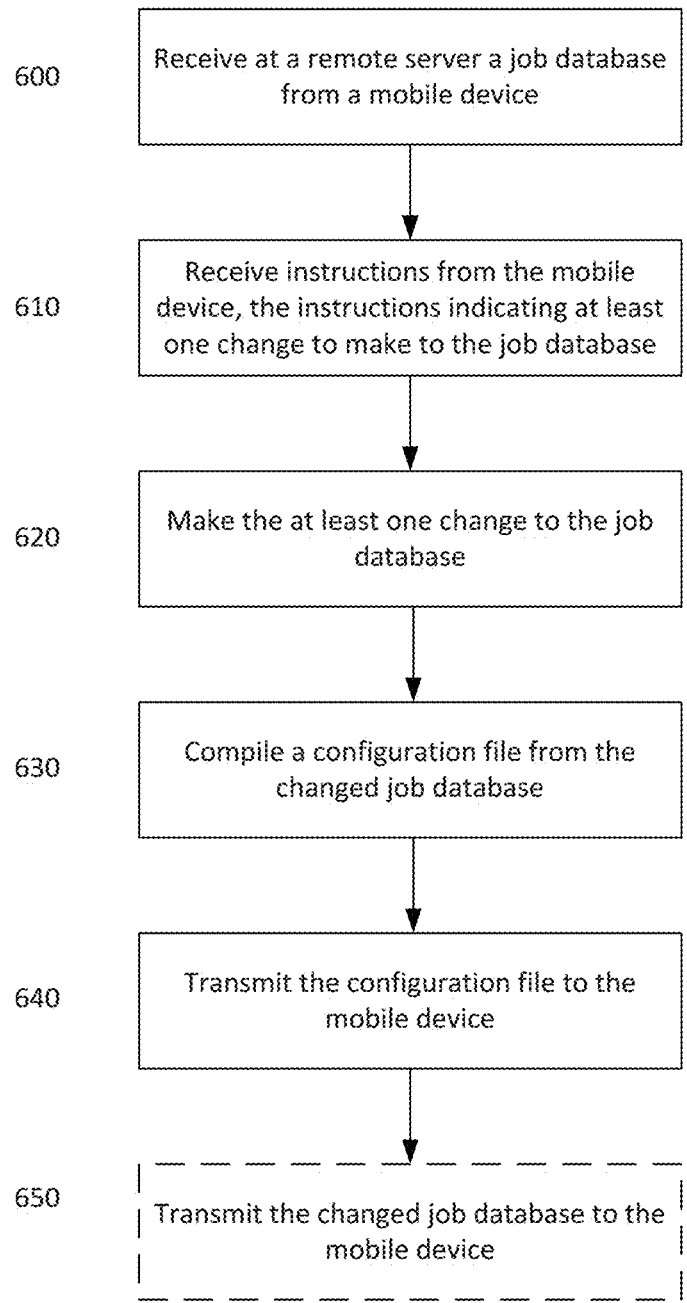

Referring now to FIG. 6, a flow diagram illustrating an exemplary method for configuring an alarm panel in accordance with the present disclosure is shown. At a first block 600 in the flow diagram, a remote server may receive a job database from a mobile device. For example, the remote server 50 may receive the job database 19-1 from the mobile device 20.

Continuing from block 600 to block 610, the remote server may receive instructions from the mobile device, the instructions including indications of modifications to make to the job database. For example, the remote server 50 may receive instructions from the mobile device 20, the instructions including indications of modifications to make to the job database 19-1. Continuing from block 610 to block 620, the remote server may make at least one change to the job database. For example, the remote server 50 may make at least one change to the job database 19-1 (thereby generating the updated job database 19-2). In some examples, the remote server 50 may receive the job database 19-1 directly from the alarm panel (e.g., over a remote service connection, or the like.)

In some examples, the configuration modification user interface 57 of the remote server 50 may facilitate making one or more changes to the job database 19-1. The at least one change may include a label change, disabling a point, enabling a point, updating a map, changing an alarm condition, and/or changing an alarm action.

Continuing from block 620 to block 630, the remote server may compile a configuration file from the changed job database. For examples, the remote server 50 may compile (e.g., using the compiler module 59) the updated configuration file 17-2 from the updated job database 19-2. Continuing from block 630 to block 640, the remote server may transmit the updated configuration file to the mobile device. For example, the remote server 50 may transmit the updated configuration file 17-2 to the mobile device 20.

The method 600 may optionally include block 650, transmit the changed job database to the mobile device. For example, the remote server 50 may transmit the updated job database 19-2 to the mobile device 20 for upload to the alarm panel 12. In some examples, the remote server 50 may transmit the updated job database 19-2 directly to the alarm panel (e.g., over a remote service connection or the like.)

In some examples, the remote server 50 may make the configuration modification user interface 57 available to the mobile device 20 and receive an indication of at least one change to make to the job database 19-1.

Figure 7B:
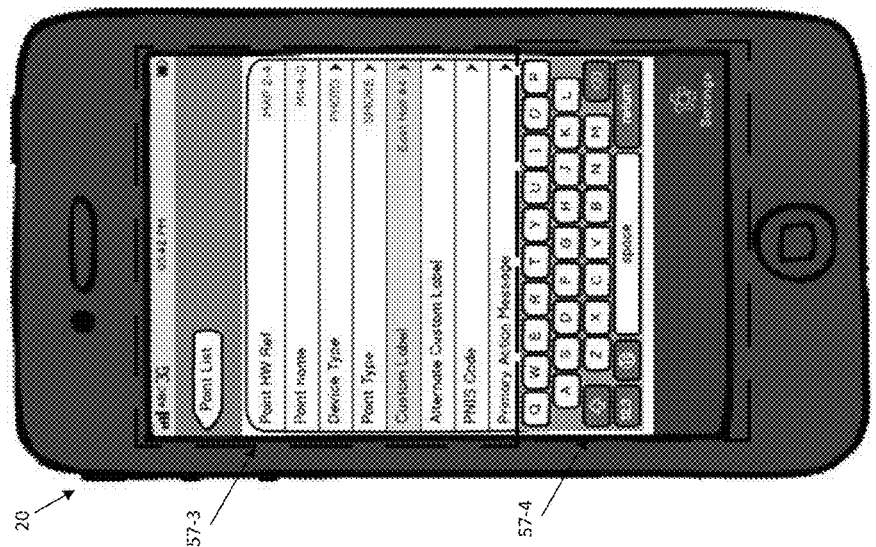
FIGS. 7A-7B are schematic diagrams of an example configuration modification user interface in accordance with the present disclosure.
Figure 7A:
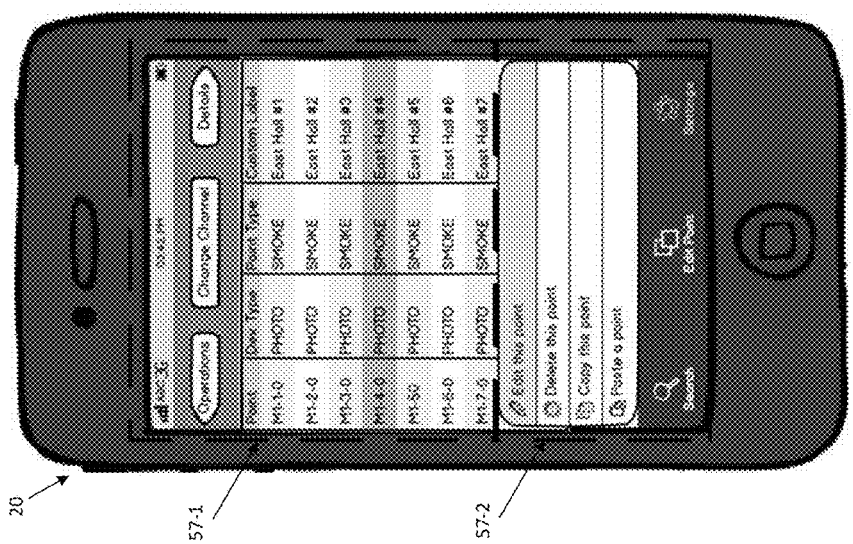

FIGS. 7A-7B are schematic diagrams of an example configuration modification user interface (and may correspond to the configuration modification user interface 57) arranged in accordance with the present disclosure. Although the diagrams represented in FIGS. 7A-7B are discussed with respect to the configuration modification user interface 57, examples are not limited in the context. As depicted, FIGS. 7A-7B show the configuration modification user interface 57 (shown in dashed-lines) displayed on a mobile device 20. Turning more particularly to FIG. 7A, a portion of the configuration modification user interface for selecting a portion of the configuration to edit is displayed. As depicted, a portion 57-1 of the interface 57 is shown including a listing of points and a portion 57-2 of the interface 57 is shown for selecting an action to perform on one or more of the listed points. For example, as can be seen from this figure, the point M1-4-0 is highlighted in the portion 57-1 and the action "Edit this point" is highlighted in the portion 57-2.

Turning more particularly to FIG. 7B now, a portion of the configuration modification user interface for editing a point is displayed. As depicted, a portion 57-3 is shown for selecting an attribute about the point to edit and a portion 57-4 for inputting desired edits. For example, the custom label field is shown highlighted in portion 57-3 and a keyboard is displayed in portion 57-4 for inputting desired edits to the custom label field.

As such, a user may manipulate the portions 57-1 and 57-2 (e.g., by interacting with the mobile device 20) to make changes to the configuration file (e.g., edit a point.) Furthermore, it is noted, that the configuration modification user interface 57 may include other features depicted in FIGS. 7A-7B. For example, portions for searching for a point, listing the points, deleting a point, copying a point, and/or modifying the setting of the interface may be available.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

The various embodiments or components described above, for example, the alarm system workstations, broker workstations, and the components or processors therein, may be implemented as part of one or more computer systems. Such a computer system may include a computer, an input device, a display unit and an interface, for example, for accessing the Internet. The computer may include a microprocessor. The microprocessor may be connected to a communication bus. The computer may also include memories. The memories may include Random Access Memory (RAM) and Read Only Memory (ROM). The computer system further may include a storage device, which may be a hard disk drive or a removable storage drive such as a floppy disk drive, optical disk drive, and the like. The storage device may also be other similar means for loading computer programs or other instructions into the computer system. As used herein, the term "software" includes any computer program stored in memory for execution by a computer, such memory including RAM memory, ROM memory, EPROM memory, EEPROM memory, and non-volatile RAM (NVRAM) memory. The above memory types are exemplary only, and are thus not limiting as to the types of memory usable for storage of a computer program.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

The invention claimed is:

1. A cloud-based method for configuring an alarm panel, the method comprising:
sending, from the alarm panel, a job database, wherein the job database is stored in the alarm panel and the job database includes a file defining settings encoded in a configuration file;
receiving, at a mobile device, the configuration file from a remote server as an attachment to an email, the configuration file compiled from the job database and including configuration parameters associated with points connected to the alarm panel;
establishing a connection between the alarm panel and the mobile device; and
transferring the configuration file from the mobile device to the alarm panel in order to modify information associated with at least one of the points connected to the alarm panel.

2. The method of claim 1, further comprising:
receiving at the mobile device the job database; and
transmitting the job database from the mobile device to the remote server.

3. The method of claim 2, further comprising:
providing instructions to the remote server, the instructions including indications of modifications to make to the job database.

4. The method of claim 3, wherein providing instructions to the remote server comprises:
accessing a configuration file modification interface on the remote server;
making at least one change to the job database using the configuration file modification interface; and
causing the configuration file to be compiled on the remote server from the changed job database.

5. The method of claim 4, wherein the at least one change is selected from the group consisting of a label change, disabling a point, enabling a point, updating a map, changing an alarm condition, or changing an alarm action.

6. The method of claim 2, wherein transmitting the job database from the mobile device to the remote server comprises transmitting the job database as an attachment to an email.

7. The method of claim 1, wherein establishing a connection between the alarm panel and the mobile device comprises establishing a wireless connection between the alarm panel and the mobile device.

8. A method of providing a configuration file for an alarm panel comprising:
sending a job database from an alarm panel, wherein the job database is stored in the alarm panel and the job database includes a file defining settings encoded in a configuration file;
receiving instructions from a mobile device, the instructions including indications of modifications to make to the job database;
making at least one change to the job database based on the received instructions;
compiling the configuration file from the changed job database, the configuration file including configuration parameters associated with points connected to the alarm panel; and
transmitting the configuration file as an attachment to an email, wherein the configuration file is transmitted to the mobile device.

9. The method of claim 8, wherein the job database is received at a remote server from either the mobile device or directly from the alarm panel.

10. The method of claim 8, wherein receiving instructions from the mobile device comprises:
making a configuration file modification interface available to the mobile device; and
receiving an indication of at least one change from the mobile device.

11. The method of claim 10, wherein the configuration file modification interface is made available over a TCP/IP connection.

12. The method of claim 10, wherein the at least one change is selected from the group consisting of a label change, disabling a point, enabling a point, updating a map, changing an alarm condition, or changing an alarm action.

13. The method of claim 8, receiving, at the remote server the job database from the mobile device connected to the alarm panel comprises receiving the job database as an attachment to an email.

14. A cloud-based alarm panel configuration system comprising:
a remote server providing a remotely accessible configuration file modification interface, the configuration file modification interface configured to compile a configuration file as an attachment to an email and transmit the configuration file to a mobile device; and
an alarm panel configured to store and send a job database and to receive the configuration file from the mobile device, the configuration file compiled from the job database and including configuration parameters associated with points connected to the alarm panel, wherein the job database includes a file defining settings encoded in the configuration file.

15. The cloud-based alarm panel configuration system of claim 14, the alarm panel further configured to establish a wireless connection with the mobile device for purposes of receiving the configuration file.

16. The cloud-based alarm panel configuration system of claim 15, the alarm panel further configured to transmit to the mobile device the job database and the remote server further configured to receive the job database from the mobile device.

17. The cloud-based alarm panel configuration system of claim 16, the remotely accessible configuration file modification interface comprising:
an interface component to facilitate indicating making at least one change to the job database; and
an interface component to facilitate causing the remote server to compile the configuration file from the changed job database.

18. The cloud-based alarm panel configuration system of claim 17, wherein the at least one change is selected from the group consisting of a label change, disabling a point, enabling a point, updating a map, changing an alarm condition, or changing an alarm action.

19. The cloud-based alarm panel configuration system of claim 16, wherein the job database is transmitted to the remote server as an attachment to an email.

20. An alarm panel configurable from a cloud-based configuration system, the alarm panel comprising:
a memory for storing a configuration file and a job database;
a connection component for establishing a connection to a mobile device and for sending the job database from the alarm panel, wherein the job database includes a file defining settings encoded in a configuration file; and a configuration file receipt component for receiving the configuration file from the mobile device, where the configuration file is compiled on the remote server based on the job database, the configuration file including parameters associated with points connected to the alarm panel.

21. The alarm panel of claim 20, the connection component further configured to transmit the job database to the mobile device, wherein the job database is such that the configuration file may be compiled therefrom.

22. The alarm panel of claim 20, wherein the connection component is configured to establish a wireless connection to the mobile device.

23. The alarm panel of claim 21, wherein the wireless connection is a Bluetooth connection or a WIFI connection.

* * * * *